United States Patent
Liu et al.

(10) Patent No.: US 8,051,419 B2
(45) Date of Patent: Nov. 1, 2011

(54) METHOD OF DYNAMICALLY ADJUSTING NUMBER OF TASK REQUEST

(75) Inventors: Hong-Liang Liu, Tianjin (CN); Ho Zhang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 1284 days.

(21) Appl. No.: 11/710,720

(22) Filed: Feb. 26, 2007

(65) Prior Publication Data

US 2008/0209418 A1    Aug. 28, 2008

(51) Int. Cl.
| G06F 9/46 | (2006.01) |
| G06F 13/12 | (2006.01) |
| G06F 13/00 | (2006.01) |
| G06F 15/16 | (2006.01) |
| G06F 11/00 | (2006.01) |

(52) U.S. Cl. ........ 718/102; 709/232; 709/234; 709/235; 710/35; 710/74; 711/147; 370/231; 370/232; 370/234

(58) Field of Classification Search .......... 718/102
See application file for complete search history.

(56) References Cited

U.S. PATENT DOCUMENTS

| 6,772,245 | B1 * | 8/2004 | Pomerantz et al. ............. 710/60 |
| 6,895,485 | B1 * | 5/2005 | DeKoning et al. ............. 711/170 |
| 6,976,134 | B1 * | 12/2005 | Lolayekar et al. ............ 711/148 |
| 7,031,928 | B1 * | 4/2006 | Cochran ........................ 705/7.11 |
| 7,162,550 | B2 * | 1/2007 | Douglas ........................ 710/35 |
| 7,421,509 | B2 * | 9/2008 | Lolayekar et al. ............ 709/235 |
| 7,539,824 | B2 * | 5/2009 | Lolayekar et al. ............ 711/148 |
| 7,685,342 | B2 * | 3/2010 | Shiraki et al. .................. 710/74 |
| 7,818,393 | B1 * | 10/2010 | Bush et al. .................... 709/217 |
| 2006/0075191 | A1 * | 4/2006 | Lolayekar et al. ............ 711/114 |
| 2008/0005490 | A1 * | 1/2008 | Shiraki et al. ................. 711/147 |

* cited by examiner

*Primary Examiner* — Jennifer To
(74) *Attorney, Agent, or Firm* — Morris Manning Martin LLP; Tim Tingkang Xia, Esq.

(57) ABSTRACT

A method of dynamically adjusting the number of task requests is provided, which is applicable to an Internet Small Computer System Interface (iSCSI) protocol. When a target receives a task request transmitted by an initiator or the target completes the task request, the number of transmissible tasks is calculated according to an average access data volume, an current access data volume, and an allowable access data volume in the target, and returned to the initiator, such that the number of the task requests transmitted simultaneously by the initiator does not exceed the number of transmissible tasks, thereby achieving flow control. The allowable access data volume is obtained through interactive and dynamic adjustment between the target and the initiator.

11 Claims, 5 Drawing Sheets

METHOD OF DYNAMICALLY ADJUSTING NUMBER OF TASK REQUEST

BACKGROUND OF THE INVENTION

1. Field of Invention

The present invention relates to a method of dynamically adjusting the number of task requests, and more particularly to a method of dynamically adjusting the number of task requests through the sum of the access data volume of temporarily stored task requests currently.

2. Related Art

The Internet Small Computer System Interface (iSCSI) protocol (RFC3720) is a protocol for storage devices using the Internet to transmit SCSI instructions to perform read and write. Two terminals employing the iSCSI protocol to communicate with other are referred to as an initiator and a target, respectively. The initiator is used to send a task request with SCSI instructions to the target. The target receives the task request, accesses the storage device, and transmits an access result to the initiator after the SCSI instructions are executed. In the iSCSI protocol, the initiator may send a plurality of tasks to the target simultaneously, and the target may temporarily store the received plurality of tasks in a queue to wait for process, thereby enhancing utilization of the Internet and execution efficiency of the initiator and the target.

However, if the initiator fails to well control the total number of the task requests simultaneously transmitted to the target, the target uses up resources after receiving so many task requests. At this time, if the initiator continues to transmit a task request to the target, the task request will be lost or a system becomes abnormal. Therefore, the initiator cannot continue to transmit a task request until the task requests temporarily stored in the target are reduced to having resources. Such a process is called a "flow control." That is, the flow control of the iSCSI protocol is to control the frequency of transmitting the task requests from the initiator to the target in the iSCSI protocol, i.e., the number of the task requests that are allowed be transmitted to the target within a certain period of time.

In fact, the flow control of the iSCSI protocol is restricted by the speed of the target processing the task requests. The speed of processing the task requests is influenced by many aspects, mainly including a memory, network bandwidth, computation capability of a processor, and the accessing performance of a storage medium. The greater the memory is, the more the temporarily stored task requests are; the wider the network bandwidth is, the more the data volume transmitted back per unit time is; the better the computation capability of the processor is, the greater the processing speed of the task requests is; and the higher the accessing performance the storage media is, the shorter the time for reading and writing the task requests on the storage medium is. However, currently, the access speed of the storage media cannot satisfy the capacity of the memory, the computation capability of the processor, and the broadband of the network, so the most significant factor affecting the flow control is the accessing performance of the storage media. Since the access speed of the storage media is a fixed value during a specific time period, the critical factor affecting the stability of the accessing performance lies in the amount of the access data volume. In spite of that, the conventional flow control is merely directed to the memory, the processor, and the bandwidth, and it is obvious that the conventional flow control is not directed to the portion which actually causes the bottle-neck of the flow, i.e., the performance of the storage media. Therefore, it has become a problem urgently to be solved that how to provide a function of adjusting the number of the task requests that may be further received according to the performance of the storage media.

SUMMARY OF THE INVENTION

In view of the above-mentioned problems, the present invention is directed to a method of dynamically adjusting the number of task requests. A target calculates the number of transmissible task requests through the sum of the temporarily stored current access data volume and the dynamically adjusted allowable access data volume and in consideration of the average access data volume, and transmits the number of the transmissible task requests to an initiator, such that the number of task requests transmitted by the initiator simultaneously does not exceed the number of the transmissible task requests. In this manner, the function of controlling the flow through the performance of a storage medium is employed indirectly, so as to solve the problem in the prior art that the flow is not controlled by the accessing performance.

In order to achieve the aforementioned object, the method provided by the present invention includes the following steps. The initiator transmits at least one first task request to the target. The target temporarily stores the first task request. The target calculates an average access data volume and a current access data volume according to the access data volume corresponding to all temporarily stored task requests. The target calculates allowable access data volume according to the average access data volume. The target calculates the difference between the allowable access data volume and the current access data volume. The target sets the quotient of the average access data volume divided by the difference between the access data volume and the current access data volume as the number of transmissible tasks. The target transmits the number of transmissible tasks to the initiator. The initiator transmits a second task request less than the number of transmissible tasks to the target.

The features and practice of the preferred embodiments of the present invention will be illustrated below in detail with reference to the drawings. The contents in the preferred embodiment are sufficient to make persons skilled in the art understand the technical contents of the present invention and carry the present invention out. Furthermore, according to the disclosure of the specification, the claims, and the drawings, persons skilled in the art may know the object and advantages of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
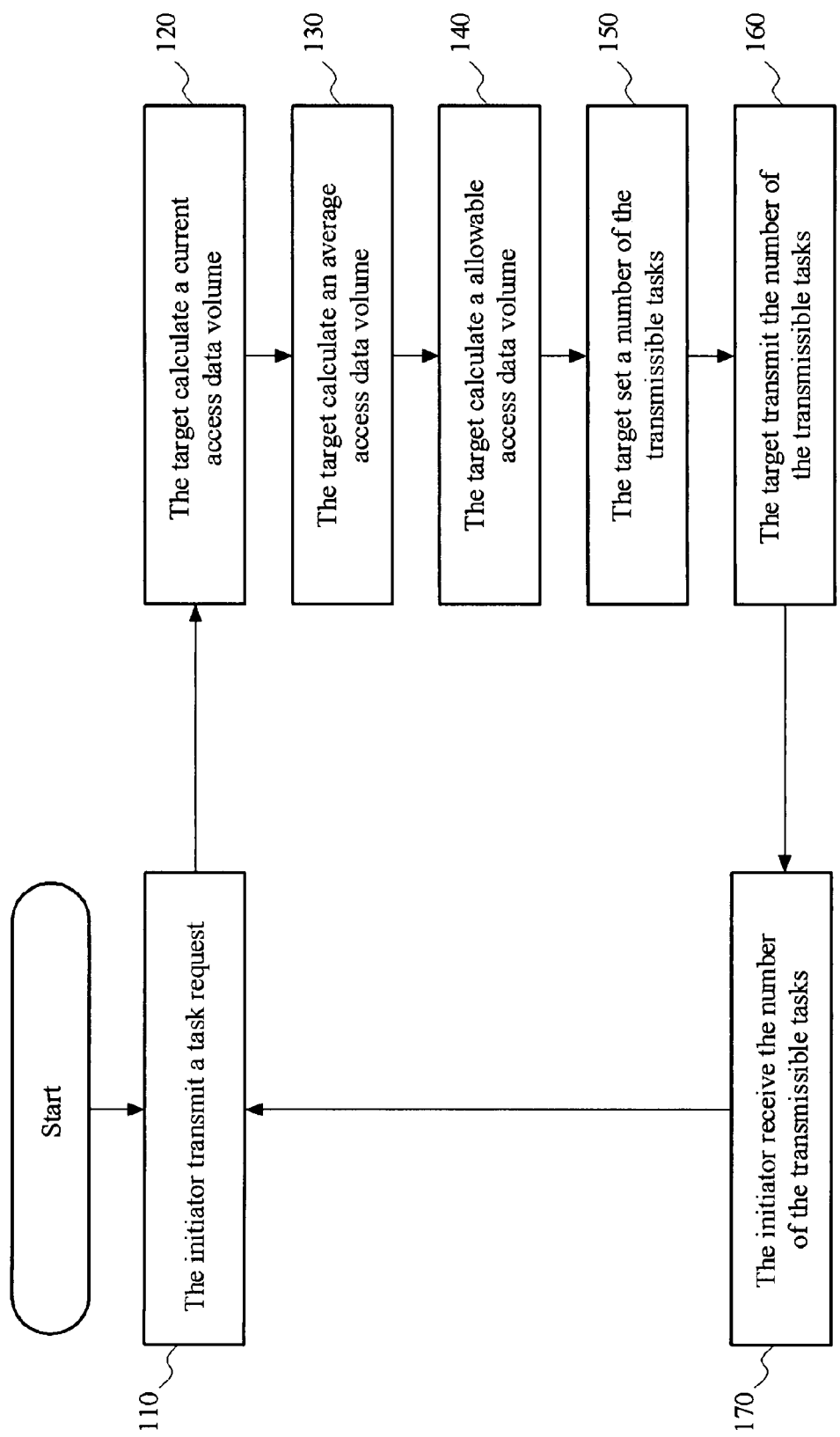
FIG. 1A is a process flow of the method of dynamically adjusting the number of task requests according to the present invention.
Figure 1B:
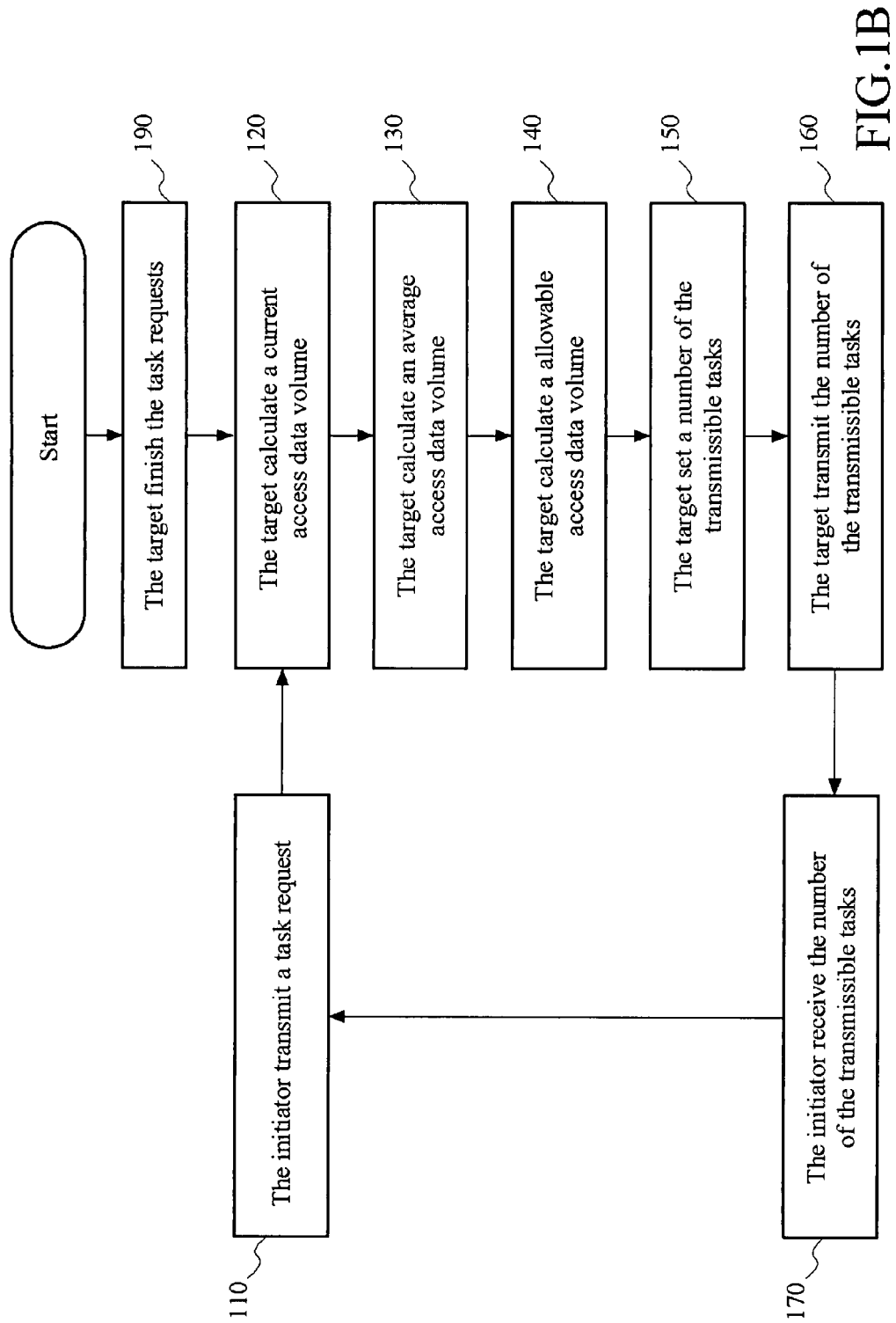
FIG. 1B is a process flow of the method of dynamically adjusting the number of task requests according to the present invention.

The operation system and method of the present invention are illustrated with an embodiment herein below. Referring to FIGS. 1A and 1B, the process flows of the method of dynamically adjusting the number of task requests are shown.

It is defined in the iSCSI protocol that, when a task request is being transmitted, the access data volume of the task request should be recorded. Therefore, in the present invention, after the task request is received, the access data volume of the received task request is easily obtained.

In this embodiment, a target is processing a first task request for writing 12 Mbytes, and another two task requests are pended, wherein one is a second task request for reading 5 Mbytes, and the other is a third task request for writing 1 Mbytes. Therefore, a current access data volume in the target is the sum of the access data volumes to be processed by the three task requests, i.e., 12+5+1=18 (Mbytes); an average access data volume is an average value of the access data volumes to be processed by the first, second, and third task requests, i.e., (12+5+1)/3=6 (Mbytes); and if a modification step in the target is set to be 5, an allowable access data volume may be calculated through multiplying the modification step by the average access data volume, i.e., 5×6=30 (Mbytes). Therefore, the number of transmissible tasks to be transmitted to the initiator from the target is two ((30−18)/6=2) now, that is, although the target has not transmitted the process results of the first to third task requests back to the initiator, the initiator still may further send two task requests to the target.

In fact, the target does not directly transmit the number of transmissible tasks to the initiator, but uses a method similar to a sliding window. The number of the transmissible tasks is represented by the difference between a maximum task number and a next task number, i.e., if the task number of the first task request transmitted by the initiator to the target is 100, the next task number transmitted by the target to the initiator is 101. Since at that time, the target allows the initiator to send only two task requests, the maximum task number transmitted by the target to the initiator is 102. In this manner, the initiator is allowed to send only two requests with the numbers 101 and 102 to the target.

When the initiator now transmits a fourth task request for writing 6 Mbytes to the target (Step 110), the target calculates the number of the transmissible tasks after receiving the fourth task request. Since the number of the transmissible tasks must be calculated from the average access data volume, the current access data volume and the allowable access data volume, the average access data volume, the current access data volume and the allowable access data volume must be firstly calculated. Since a new task request is generated and the number of the current task requests in the target is changed to be four, the current access data volume is changed to be 12+5+1+6=24 (Mbytes) (Step 120); the average access data volume is changed to be (12+5+1+6)/4=6 (Mbytes) (Step 130); and the allowable access data volume is changed to be 5×6=30 (Mbytes) (Step 140). After the average access data volume, the current access data volume and the allowable access data volume are calculated, the number of the transmissible tasks may be calculated to be (30−24)/6=1 by the computation expression (allowable access data volume-current access data volume)/average access data volume (Step 150). Thus, the target transmits the number of the transmissible tasks back to the initiator (Step 160). After the initiator receives the number of the transmissible tasks (Step 170), no more than one task request is allowed to be transmitted next time (Step 110). That is to say, after the target completes the first task request, the initiator may send a task request to the target. The step of calculating the current access data volume (Step 120) and the step of calculating the average data volume (Step 130) are not inter-related, and thus the precedence order of the two may be changed.

After the first task request is completed (Step 190), the target begins processing the second task request. At this time, the target recalculates the number of the transmissible tasks, as shown in FIG. 1B. Before the number of the transmissible tasks is calculated, the average access data volume, the current access data volume and the allowable access data volume are firstly calculated. The average access data volume is an average value of the task requests, and will not be changed as no new task request is generated, so the value is 6 (Mbytes) (Step 130). Since the first task request is completed, the current access data volume is changed to be the sum of the access data volumes of the second, third, and fourth task requests, and the value is 5+1+6=12 (Mbytes) (Step 120). Since the average access data volume is not changed, the allowable access data volume calculated from multiplying the modification step by the average access data volume is not changed, and the value is still 30 (Mbytes) (Step 140). The calculated number of the transmissible tasks is (30−12)/6=3 (Step 150). Therefore, the target sends the number of the transmissible tasks to the initiator (Step 160), and after receiving the number of the transmissible tasks (Step 170), the initiator may transmit at most three task requests to the target the next time (Step 110).

In this manner, the present invention may solve the problem in the prior art that the accessing performance of the storage media is not used as a reference of the flow control.

Figure 1C:
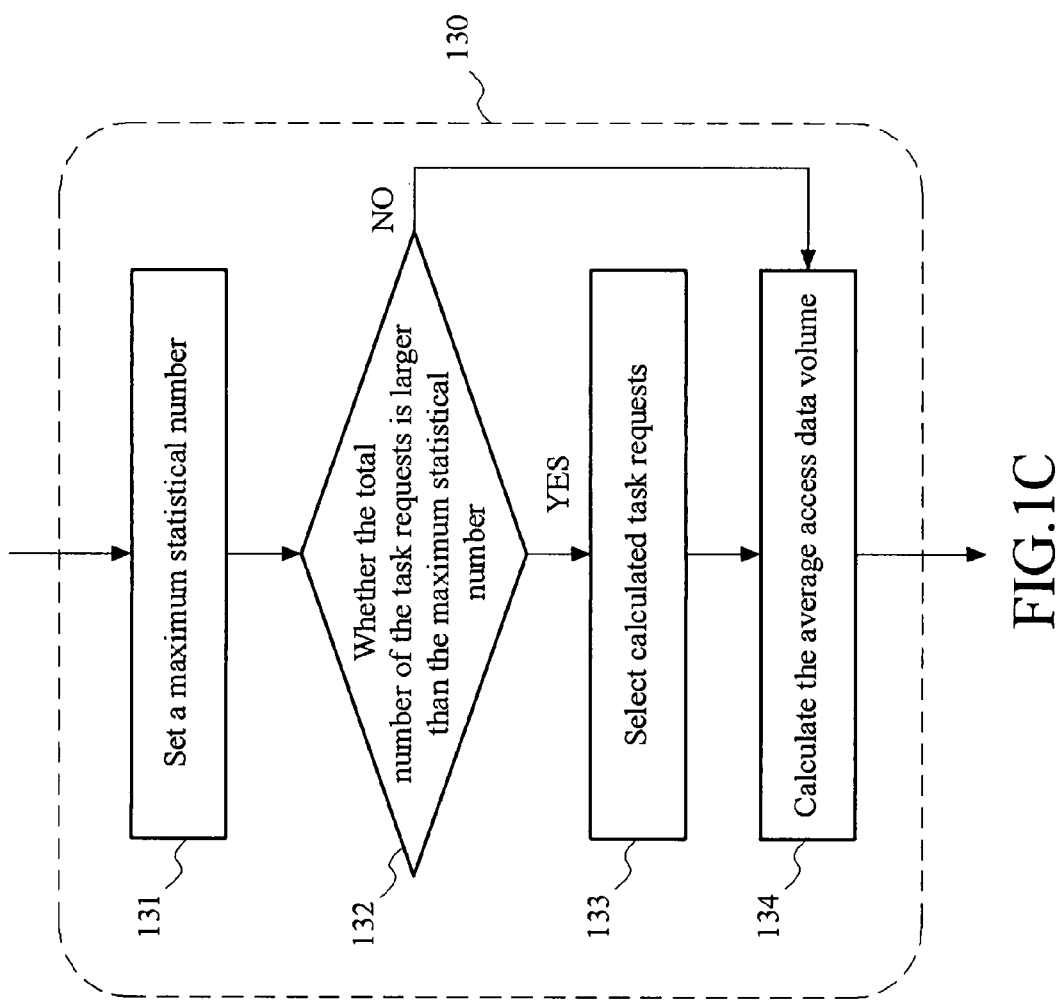
FIG. 1C is a process flow of the method of calculating an average access data volume according to the present invention.

In the process of calculating the average access data volume (Step 130), in order to obtain the average access data volume more accurately, a maximum statistical number may be used to calculate the average access data volume, such that the average access data volume is not calculated according to the received task requests any longer, but calculated from the maximum statistical number of task requests received by the target at a time closest to the computing time, as shown in FIG. 1C. If the target sets the maximum statistical number to be 3 (Step 131), after the fourth task request is received by the target, because there are 4 task requests in total temporarily stored in the target, which is larger than the maximum statistical number (Step 132), the target selects three task requests closest to the computing time, i.e., the second, third, and fourth task requests (Step 133). Therefore, the average access data volume is calculated from the second, third, and fourth task requests and is (5+1+6)/3=4 (Mbytes) (Step 134), and the allowable access data volume is changed to be 5×4=20 (Mbytes) (Step 140). Thus, the target may receive two ((20−12)/4=2) task requests (Step 150).

Figure 1D:
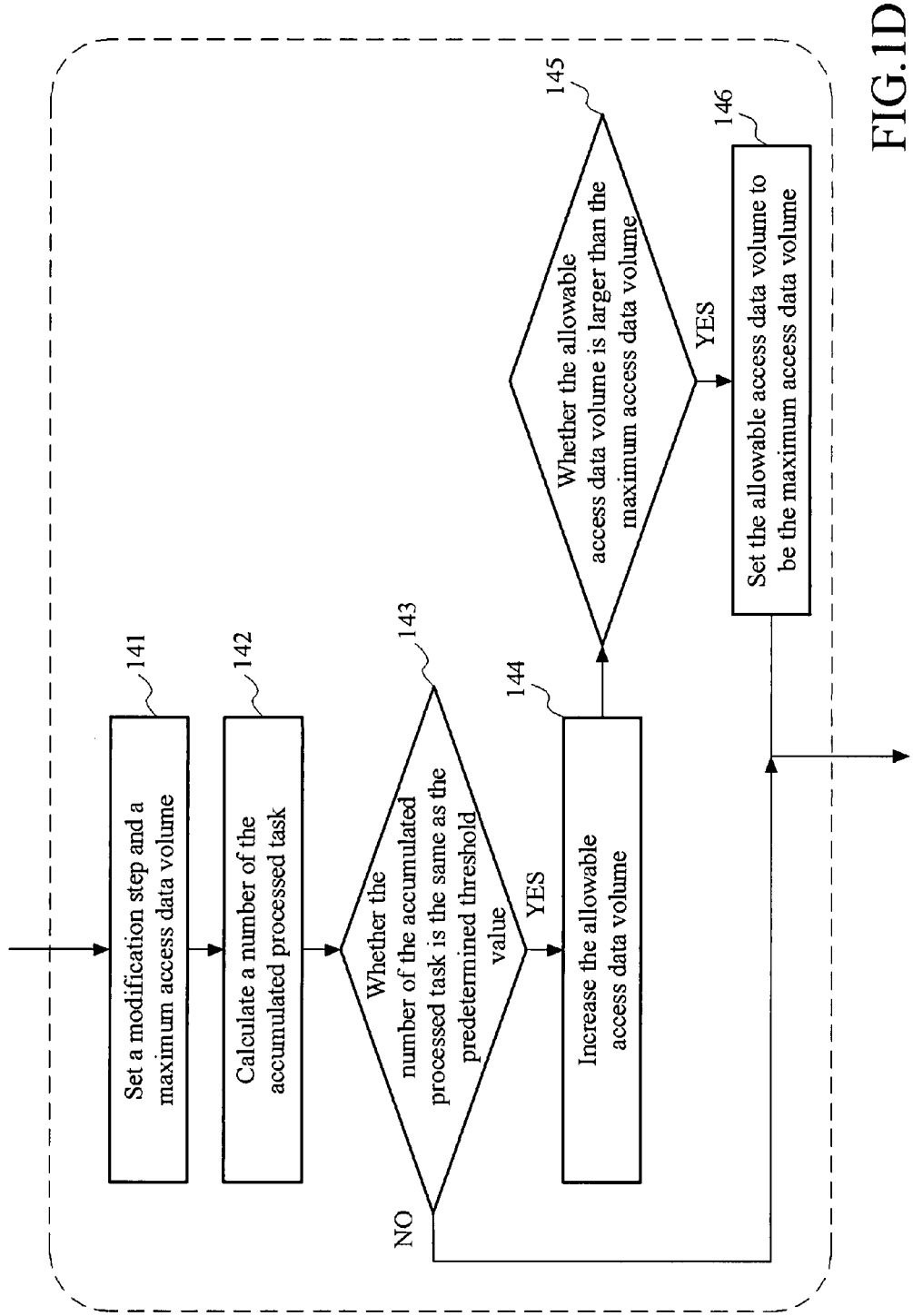
FIG. 1D is a process flow of the method of increasing an allowable access data volume according to the present invention.

After that, the target successively finishes processing the second, third, and fourth task requests, accordingly adjusts the number of the task requests that can be received, and receives new task requests. In this process, if the target and the initiator interacts well and the task requests transmitted from the initiator to the target are all on time, after a predetermined number of task requests have been processed, the target will increase the allowable access data volume in the step of calculating the allowable access data volume (Step 140). As shown in FIG. 1D, when the predetermined threshold value set by the target is 4 (Step 141), the number of the accumulated processed tasks is added by 1 each time the target finishes processing the first, second, third, and fourth task requests normally (Step 142), such that the number of the accumulated processed tasks is 4. Therefore, after the target finishes processing the fourth task request, the number of the accumulated processed tasks is the same as the predetermined threshold value (Step 143). The target increases the allowable access data volume, such that the tasks temporarily stored in the target are increased (Step 144). Generally speaking, the target adds one average access data volume to the allowable access data volume each time. Of course, in order to prevent the target from accumulating too many tasks to be processed, another maximum access data volume should be set (Step 141). If the increased allowable access data volume is not larger than the maximum access data volume (Step 145), the allowable access data volume may still be increased, but the allowable access data volume is merely allowed to be increased to be the maximum access data volume (Step 146). The target may change the allowable access data volume (the predetermined threshold value, i.e., the threshold of the number of the finished task requests allowing the change of the allowable access data volume) at any time. However, a recommended value is set after a series of tests, and in this embodiment, the recommended value is the modification step. That is to say, in the aforementioned step, the threshold value of the target is set to be 5, and the allowable access data value is changed after 5 task requests have been finished normally. In this embodiment, the reason why the predetermined threshold value is set to be the modification step lies in that the modification step is a moderate value. If the value is larger than the modification step, the allowable access data volume is increased slowly, and the value cannot be increased when many task requests are processed normally. If the value is smaller than the modification step, the allowable access data value is increased too quickly, thereby causing possible instability of the system performance. In the present invention, the predetermined threshold value is suggested to be larger than or equal to the modification step, otherwise, the allowable access data volume is changed too quickly, thus influencing the stability of the performance of the iSCSI, while the flow control is directed to the stability of performance of the storage medium.

If the target and the initiator do not interact well, in the process of the target processing the first task request, the second request sent by the initiator is overtime, and the initiator then sends a fifth task request for deleting the second task (Step 110), the target recalculates the current access data volume to be the sum 1+6=7 (Mbytes) of the access data volumes of the third and fourth task requests after receiving the fifth task request (Step 120), and the average access data volume and the allowable access data volume are not changed (Step 130, Step 140). Therefore, the number of the task requests that can be received by the target becomes 3 ((20−7)/4=3.25) (Step 150).

Figure 1E:
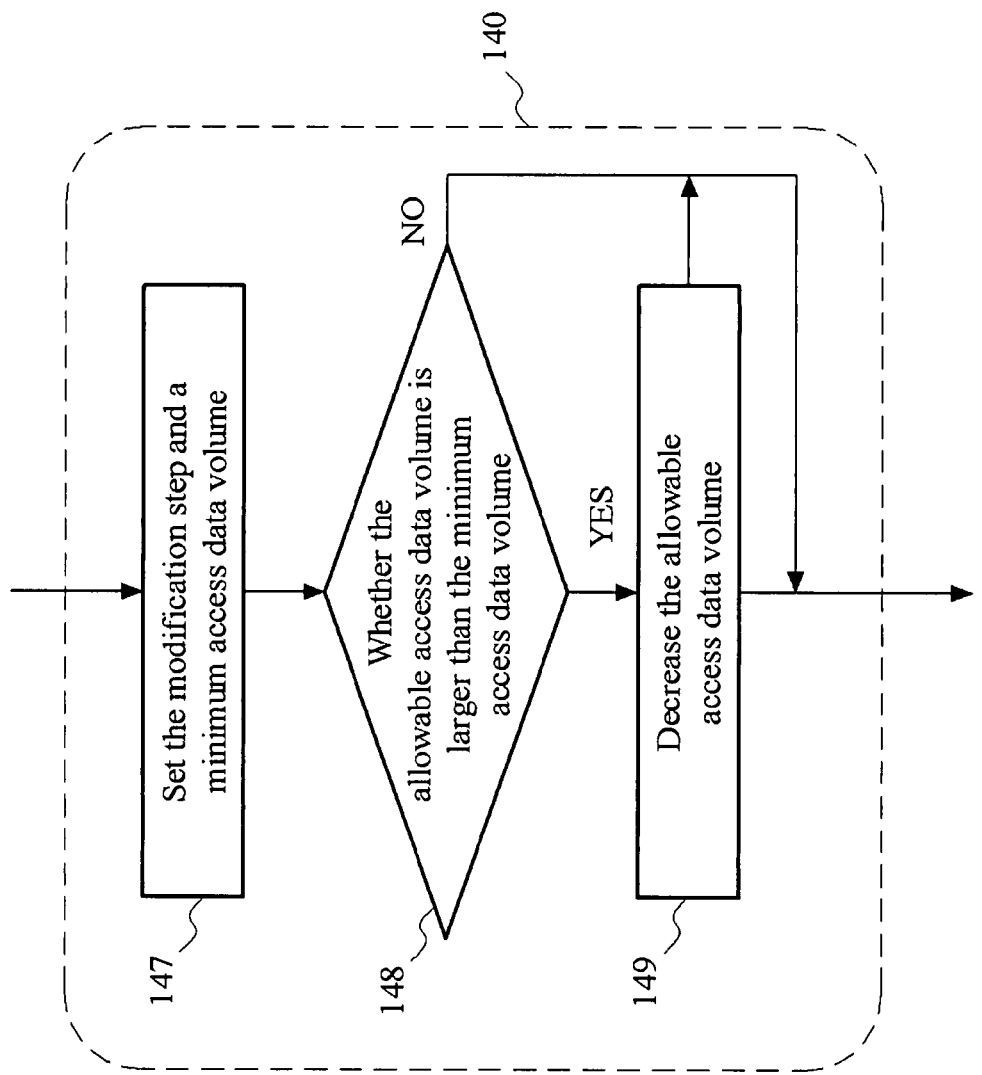
FIG. 1E is a process flow of the method of decreasing the allowable access data volume according to the present invention.

In order to prevent the tasks being retransmitted again and again due to continuous overtimes, the target decreases the allowable access data volume. As shown in FIG. 1E, when receiving the fifth task request for deleting the second task request (Step 110), the target decreases the allowable access data volume by a predetermined value (Step 149) in the step of recalculating the allowable access data volume (Step 140), in which the predetermined value is often set to be the product of multiplying the modification step by the average access data volume. However, even if the predetermined value is set randomly, the operation of the present invention will not be influenced, because the allowable access data volume is gradually adjusted to be a value most suitable for the operation with the generation and completion of the task requests. Likewise, in order to prevent the allowable access data volume from being so small that the initiator cannot transmit a request to the target, the target also sets a minimum access data volume (Step 147). If the allowable access data volume is smaller than the minimum access data volume (Step 148), the allowable access data volume is set to be the minimum access data volume, in which the minimum access data volume is usually twice of the average access data volume, so as to prevent the circumstance that the number of the transmissible tasks is zero when the allowable access data volume is further decreased.

Furthermore, the method of dynamically adjusting task requests provided by the present invention is not only realized in hardware, software, or a combination thereof, but also realized in a computer system concentratedly or by distributing different elements in several interconnected computer systems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of dynamically adjusting number of task requests, applicable to an Internet Small Computer System Interface (iSCSI) protocol, comprising:

transmitting at least one first task request to an target by an initiator;

temporarily storing the first task request by the target;

calculating an average access data volume and a current access data volume by the target according to each access data volume corresponding to all temporarily stored task requests;

calculating an allowable access data volume by the target according to the average access data volume;

calculating a difference between the allowable access data volume and the current access data volume by the target;

setting a number of transmissible tasks by the target according to a quotient of the average access data volume divided by the difference;

transmitting the number of transmissible tasks to the initiator by the target; and transmitting a second task request less than the number of transmissible tasks to the target by the initiator.

2. The method as claimed in claim 1, wherein the average access data volume is an average value of each of the access data volumes corresponding to the all task requests temporarily stored in the target.

3. The method as claimed in claim 1, wherein the step of calculating an average access data volume further comprises:

setting a maximum statistical number; and calculating the average access data volume by the maximum statistical number of task requests which are temporarily stored in the target at latest, when a total number of all the task requests temporarily stored in the target is larger than the maximum statistical number.

4. The method as claimed in claim 1, wherein the current access data volume is a sum of each of the access data volumes of all the task requests temporarily stored in the target.

5. The method as claimed in claim 1, wherein the step of calculating an allowable access data volume comprises:
  setting a modification step; and
  setting the allowable access data volume to be a product of multiplying the modification step by the average access data volume.

6. The method as claimed in claim 1, further comprising:
  calculating a number of accumulated processed tasks by the target after one of all the temporarily stored task requests is finished; and
  increasing the allowable access data volume to recalculate the number of the transmissible tasks, when it is determined that the number of accumulated processed tasks is same as a predetermined threshold value.

7. The method as claimed in claim 6, wherein the step of increasing the allowable access data volume is setting the allowable data access volume to be a sum of the allowable access data volume and the average access data volume.

8. The method as claimed in claim 6, wherein the step of increasing the allowable access data volume further comprises:
  setting a maximum access data volume;
  increasing the allowable access data volume when it is determined that the allowable access data volume is smaller than the maximum access data volume; and
  setting the allowable access data volume to be the maximum access data volume when it is determined that the allowable access data volume is larger then the maximum access data volume.

9. The method as claimed in claim 1, further comprising a step of receiving a task deletion request and decreasing the allowable access data volume to recalculate the number of the transmissible tasks.

10. The method as claimed in claim 9, wherein the step of decreasing the allowable access data volume further comprises:
  setting a modification step; and
  setting the allowable data access volume to be a result obtained by subtracting a product of multiplying the modification step with the average access data volume from the allowable access data volume.

11. The method as claimed in claim 9, wherein the step of decreasing the allowable access data volume further comprises:
  setting a modification step and a minimum access data volume; and
  decreasing the allowable access data volume when it is determined that the allowable data access volume is larger than the minimum access data volume.

* * * * *